pany, New York, N. Y., a corporation of Dela-
UNITED STATES PATENT OFFICE 2,569,440

SEPARATION OF ISOPHTHALIC ACID FROM TEREPHTHALIC ACID BY NONCATALYTIC ESTERIFICATION

Robert J. Agnew, Pawling, and Robert E. Conary, Beacon, N. Y., assignors to The Texas Company, New York, N. Y., a corporation of Delaware No Drawing. Application August 11, 1949, Serial No. 109,818

10 Claims. (Cl. 260—525)

This invention relates to a process for separating a mixture of benzene dicarboxylic acids into its component isomeric acids. More particularly, this invention provides a method for separating para benzene dicarboxylic acid, commonly called terephthalic acid, from meta benzene dicarboxylic acid, commonly called isophthalic acid.

The separation of a mixture of benzene dicarboxylic acids into meta and para isomers is troublesome. Phthalic acid, the ortho isomer, is readily separated from the meta and para isomers since it alone forms an anhydride. However, the usual physical and chemical means of separation are not effective for separating isophthalic from terephthalic acid because of their similar properties. Heretofore, one method of separating terephthalic acid from isophthalic acid has involved forming the alkyl esters of the acids, fractionating the esters, and saponifying the ester fractions; ordinarily the dimethyl esters are used to effect separation in this manner. This invention provides a simple one-step process for effecting such a separation which avoids distillation and saponification steps.

The oxidation of a mixture of difficultly separable meta and para xylenes constitutes one of the most economical and practical methods of preparing isophthalic and terephthalic acids. Because of the difficulties attending the separation of isomeric xylenes, it has been found advisable to separate the product benzene dicarboxylic acids.

In accordance with this invention, separation of terephthalic acid from isophthalic acid is effected by subjecting a mixture of these benzene dicarboxylic acids to non-catalytic esterification with an alcohol. Isophthalic acid reacts with the alcohol to form an ester, whereas terephthalic acid does not esterify in the absence of a catalyst. A temperature of at least 110° C. is employed for the esterification. On cooling the reaction mixture, terephthalic acid precipitates therefrom and is readily separated from the reaction mixture by filtration. Since a temperature of at least 110° C. is employed for the noncatalytic esterification reaction, it is advisable to employ alcohols containing more than four and preferably more than six carbon atoms.

The advantages of the process of this invention are numerous. First and foremost, a simple one-step procedure is made available for the separation of terephthalic acid from isophthalic acid. Secondly, the terephthalic acid as recovered is ready for use as an intermediate in chemical manufacture without further treatment. Thirdly, the esters of isophthalic acid, the byproduct of the process of this invention, are excellent plasticizers; the $C_4$ to $C_{10}$ alkyl esters of isophthalic acid are particularly good plasticizers for vinyl-type resins. The emergence of terylene, a polyester of glycol and terephthalic acid, as a resin having a fibrous structure suitable for wearing apparel has stimulated interest in the means for separating terephthalic acid from the isophthalic acid concomitantly produced in the oxidation of xylene isomers. This invention provides a convenient, effective means for isolating terephthalic acid from a mixture of benzene dicarboxylic acids, and marks a significant advance in making fibrous alkyd-type resins.

Monohydroxy alcohols are employed in the separation procedure of this invention. It is advisable not to use polyhydroxy alcohols because viscous resins result from the esterification of polyhydroxy alcohols with meta-benzene dicarboxylic acids. Aliphatic, cyclic, and heterocyclic monohydroxy alcohols can be used in the process of this invention. Aliphatic alcohols, such as hexanol, n-octanol, and 2-ethylhexanol are ordinarily employed but cyclic alcohols such as cyclohexanol, arylaliphatic alcohols such as benzyl alcohol and heterocyclic alcohols, such as furfuryl alcohol and thenyl alcohol may also be employed in the process of this invention.

An alcohol with a boiling point of 110° C. or higher is employed in order to effect non-catalytic esterification of the isophthalic acid portion of dicarboxylic acid mixture. Accordingly, an alcohol containing at least four carbon atoms is used. The $C_6$ to $C_{10}$ aliphatic alcohols are preferred esterifying agents. As is well known, it is advisable to use primary alcohols for the esterification step since secondary and tertiary alcohols tend to dehydrate to olefins during purification of the esters formed therefrom.

The non-catalytic esterification step of this invention is advantageously effected in an inert solvent medium. An aromatic hydrocarbon, such as xylene, or a high boiling naphtha fraction is generally employed as solvent. The fact that the temperature during the non-catalytic esterification should be maintained above 110° C. indicates that the solvent medium also should have a boiling point of at least 110° C. Toluene with a boiling point about 111° C. may be employed as a solvent, but it is advisable to employ xylene having a boiling point of 139° C. or a high boiling naphtha fraction having an I. B. P. of about 135° C.

A minimum temperature of 110° C. has been specified for the non-catalytic esterification process of this invention but temperatures of 125 to 175° C. are recommended. At temperatures above about 225° C. a plurality of side reactions occur so that it is advisable to maintain a temperature below about 200° C.

The separation process of this invention is applicable to the separation of terephthalic acid from a mixture of ortho-, meta- and para-benzene dicarboxylic acids. Both the ortho and the meta isomers react with an alcohol under non-catalytic esterification conditions to form esters, whereas terephthalic acid does not esterify under the prescribed conditions. However, it is ordinarily more convenient to first separate phthalic acid from the mixture of benzene dicarboxylic acids by forming its anhydride; the anhydride has physical properties essentially distinct from the isophthalic and terephthalic acids.

The process of the subject invention is very simply effected. A mixture of terephthalic and isophthalic acids, a solvent, such as xylene, and an alcohol, such as 2-ethylhexanol, are mixed and heated under reflux. The alcohol is added in large molar excess over the amount required to esterify with the isophthalic acid present in the mixture. The water formed by esterification of the isophthalic acid is constantly removed from the reaction mixture. When substantially no further water is formed, the reaction mixture is allowed to cool whereupon unreacted terephthalic acid precipitates out. Upon filtration of the reaction mixture, substantially pure terephthalic acid is obtained, whereas the isophthalic acid is found in the filtrate in the form of a liquid ester. Upon removal of solvent and excess alcohol from the reaction mixture, there is recovered an isophthalate diester which is an excellent vinyl resin plasticizer. The terephthalic acid filtered from the cooled esterification mixture is substantially pure as indicated by infra-red analysis.

In order to describe the invention more fully, there follows a detailed description of the process of the subject invention for separating a mixture of isophthalic and terephthalic acids.

Example I 42 g. of a 50–50 mixture of isophthalic and terephthalic acids, 153 g. of n-octyl alcohol and 150 cc. of xylene were mixed and placed in a vessel fitted with a reflux condenser to which was attached a trap whereby water of esterification could be collected and separated from the reaction mixture. The reaction mixture was heated under reflux at a temperature of 174° C. for 27 hours at which time 4.8 cc. of water had been separated from the refluxing mixture; the theoretrical amount of water for esterifying the isophthalic acid portion of the mixture was 4.55 cc. Heating for an additional 6 hours resulted in the separation of only an additional 0.3 cc. of water. The reaction mixture after heating under reflux for 33 hours was cooled whereupon a precipitate of unesterified terephthalic acid formed. The reaction mixture was filtered to give 18 g. of precipitate which was proven to be pure terephthalic acid by infra-red analysis. The filtrate was subjected to vacuum distillation for removal of excess n-octyl alcohol and xylene. The distillation residue could be further purified by distillation to give dioctyl isophthalate, which has properties which make it an excellent plasticizer.

Example II 42 g. of a mixture comprising 1 part isophthalic acid and 3 parts terephthalic acid, 155 g. of n-octyl alcohol and 85 cc. of xylene were mixed and placed in a vessel fitted with a reflux condenser to which was attached a trap whereby water of esterification could be collected and separated from the reaction mixture. The reaction mixture was heated under reflux at a temperature of 164° C. for 27 hours at which time 3 cc. of water had been separated from the refluxing mixture; the theoretical amount of water for esterifying the isophthalic acid portion of the mixture was 2.28 cc. After 27 hours of refluxing, the reaction mixture was cooled whereupon a precipitate of unesterified terephthalic acid formed. The reaction mixture was filtered to give 29.9 g. of precipitate which was proven to be pure terephthalic acid by infra-red analysis. The excess n-octyl alcohol and xylene were removed by vacuum distillation from the filtrate leaving dioctyl isophthalate which can be further purified by vacuum distillation.

Example III 42 g. of a mixture comprising 3 parts isophthalic acid and 1 part terephthalic acid, 155 g. of n-octyl alcohol and 85 cc. of xylene were mixed and placed in a vessel fitted with a reflux condenser to which was attached a trap whereby water of esterification could be collected and separated from the reaction mixture. The reaction mixture was heated under reflux at a temperature of 164° C. for 38 hours at which time 6.80 cc. of water had been separated from the refluxing mixture; the theoretical amount of water for esterifying the isophthalic acid portion of the mixture was 6.83 cc. After 38 hours of refluxing, the reaction mixture was cooled whereupon a precipitate of unesterified terephthalic acid formed. The reaction mixture was filtered to give 5 g. of precipitate which was proved to be predominantly terephthalic acid by infra-red analysis. The excess n-octyl alcohol and xylene were removed by vacuum distillation from the filtrate leaving dioctyl isophthalate which can be further purified by vacuum distillation.

The foregoing examples illustrate the application of the process of this invention to the separation of mixtures of isophthalic and terephthalic acids of varying compositions. As has been indicated heretofore, the process is also adaptable to the separation of terephthalic acid from a mixture comprising the three isomeric benzene dicarboxylic acids. The process of the invention is also applicable to the separation of homologs, and derivatives of terephthalic acid from isophthalic acid, its homologs and derivatives. Accordingly, homologs of terephthalic acid, such as, 2-methyl 1, 4 benzene dicarboxylic acid may be separated by the process of this invention from isophthalic acid itself or from isophthalic homologs, such as, 2-ethyl 1, 3 benzene dicarboxylic acid. In similar fashion, the process is applicable to the separation of halo- and nitro- derivatives of terephthalic acid from isophthalic acid, its halo- and nitro- derivatives.

Obviously, many modifications and variations of the invention, as hereinbefore set forth, may be made without departing from the spirit and scope thereof, and therefore, only such limitations should be imposed as are indicated in the appended claims.

We claim:

1. A process for separating terephthalic acid, and homologs thereof from a mixture of benzene dicarboxylic acids which comprise subjecting said mixture to non-catalytic esterification with a monohydroxy alcohol at a temperature between 110 and 225° C. and separating non-esterified terephthalic acid, and homologs thereof from the mixture.

2. A process according to claim 1 in which a monohydroxy alcohol containing at least four carbon atoms is employed in the esterification.

3. A process according to claim 1 in which the esterification is effected in the presence of an inert solvent having a boiling point above 110° C.

4. A process for separating terephthalic acid from a mixture of benzene dicarboxylic acids which comprises subjecting said mixture to non-catalytic esterification with a monohydroxy alcohol at a temperature between 110 and 225° C. and separating non-esterified terephthalic acid from said mixture.

5. A process according to claim 4 in which a primary aliphatic monohydroxy alcohol containing between 6 and 10 carbon atoms is employed in the esterification.

6. A process according to claim 4 in which xylene is employed as a solvent.

7. A process for separating terephthalic acid from a mixture comprising terephthalic and isophthalic acids which comprises subjecting said mixture to non-catalytic esterification with a monohydroxy alcohol at a temperature between 110 and 225° C. and separating non-esterified terephthalic acid from said mixture.

8. A process according to claim 7 in which a primary monohydroxy alcohol boiling above 110° C. is employed in the esterification.

9. A process for separating terephthalic acid from a mixture comprising terephthalic and isophthalic acids which comprises subjecting said mixture to non-catalytic esterification with a primary monohydroxy alcohol at a temperature between 110 and 225° C., cooling the product of said esterification, and filtering precipitated non-esterified terephthalic acid from said cooled product.

10. A process according to claim 9 in which the esterification is effected in the presence of a solvent boiling above 110° C.

ROBERT J. AGNEW.
ROBERT E. CONARY.

REFERENCES CITED

The following references are of record in the file of this patent:

UNITED STATES PATENTS

| Number | Name | Date |
|---|---|---|
| 1,708,404 | Zimmerli | Apr. 9, 1929 |
| 1,848,724 | Jaeger | Mar. 8, 1932 |
| 1,993,736 | Graves et al. | Mar. 12, 1935 |
| 2,091,241 | Kvalnes | Aug. 24, 1937 |
| 2,245,528 | Loder | June 10, 1941 |
| 2,479,066 | Gresham | Aug. 16, 1949 |

OTHER REFERENCES

Smith: J. Am. Chem. Soc., vol. 43, pp. 1920–1924 (1921).